United States Patent Office 3,832,260
Patented Aug. 27, 1974

3,832,260
METHOD AND APPARATUS FOR SIMULTANE-
OUSLY APPLYING TO AN EXTENDED CYLIN-
DRICAL OBJECT A COATING AND A PLASTIC
FILM WRAPPING TO RETAIN THE COATING
Clemens F. Straughan and Charles A. Schad, Tulsa,
Okla., assignors to CFS Corporation, Tulsa, Okla.
Continuation-in-part of application Ser. No. 142,452,
May 12, 1971. This application May 17, 1972, Ser. No.
253,943
Int. Cl. B29f 1/10
U.S. Cl. 156—390                                    19 Claims

ABSTRACT OF THE DISCLOSURE

This invention describes a method of placing a coating of material circumferentially about an extended cylindrical object and holding the material in place by means of a longitudinally folded and sealed plastic coating. This is accomplished by folding and wrapping a plastic film about the long object. The diameter of the resulting plastic cylinder is greater than that of the object, so as to provide sufficient space in the annulus for the coating material. The two edges of the plastic are sealed either by cementing one to the other or by applying a sealing strip over the edges. The coating material is applied into the annulus through a pipe between the object and the film cylinder. By the use of a heat shrinkable plastic film the film can be shrunk to tightly fit the coating material.

CROSS REFERENCE TO RELATED APPLICATION

This application is a continuation-in-part of the copending application Ser. No. 142,452, of the same title, invented by one of the two coinventors of this application and filed May 12, 1971.

BACKGROUND OF THE INVENTION

This invention is in the field of pipe coatings and protective wrappings. More particularly it is concerned with the application to long cylindrical objects such as tubes, pipes, electrical cables, etc., of uniformly thick circumferential coatings of selected materials, and the protection of the coatings by means of sealed longitudinal wrappings of films of plastic, paper, etc.

Still more particularly, this invention is concerned with the simultaneous application of a continuous plastic or synthetic film or wrap to a cylindrical object, such as a pipe or conduit and the injection of a circumferential coating of a selected material into the annular space between the object and the film.

Pipelines are typically coated with a helically wound wrap of chemically treated paper, felt or similar protective material. The wrap is sometimes bonded to the pipe by an undercoating of adhesive, or similar material, applied to the pipe by brush, spray or the like. This process is only workable when the pipe coating is very thin, is of the proper nature, and is of the proper consistency. If thick coatings are applied by this method, pressure of the wrappings tends to distort the thickness and character of the coating, with unsatisfactory results.

Also there are many applications in industry, particularly in the petroleum industry, where a thermal insulating coating, such as produced by means of a foamed plastic material, are required. One application is in the pipe-lining of heavy, viscous oil. Such oil can be heated to make it of low enough viscosity to pump, and the heat conserved by means of the insulation so as to permit the transport of the viscous oil over long distances. Also, there are delicate objects such as a telephone cable, containing many wires and coaxial conductors, that may be damaged very easily by side pressure on the cable. It is customary, therefore, to place these cables in rigid conduits so as to free the cable of any side pressure which might damage it. However, by the use of deformable protective coatings, such as the foamed plastic, these delicate longitudinal objects, such as telephone cables, can be protected against the pressure of rocks and other objects in a trench.

SUMMARY OF THE INVENTION

It is a principal object of this invention to provide a method and apparatus for simultaneously applying a uniformly thick coating of a selected material to a pipe, conduit, cable or other long cylindrical object and simultaneously forming, wrapping and sealing a circumferential layer of plastic film, to contain and protect the applied coating.

It is a further object to accomplish this with a pipeline traveling device or apparatus, through which the pipe or conduit will travel.

It is a further object to provide a coating of foam plastic material in the annular space between the long cylindrical object and the circumferential plastic film.

These objects are realized and the limitations of the prior art devices are overcome in this invention by providing an assembly which can guide a long cylindrical object therethrough, or can be transported along such an object, such as a pipeline. Means are provided on a frame for supporting the long cylindrical object by rollers. The frame carries a strip of plastic film which is folded, formed and wrapped around the cylindrical object to form a longitudinal overlapping seam with the plastic film, forming a complete and void-free protective coating. The forming device, also known as forming head or simply, former, is of cylindrical form and of an internal diameter substantially the same as the diameter of the resulting plastic cylinder, which is to form the outer surface of the finished coating.

The flat strip is formed around the former into the cylindrical form, and the edges are sealed by means of an overlapping strip of gummed tape which is pressed on the outside of the seam, and against a longitudinal pressure bar or mandrel supported on the inside of the plastic cylinder, so that the pressure of the roller will firmly attach and seal the cylinder. The edges of the formed cylinder can be sealed by any of the known commercial methods such as by heat, adhesive, ultrasonic bonding, etc. The pressure bar is arcuate in shape to match the interior surface of the cylinder. It need not be much wider than the roller itself, and particularly does not need to be a continuous cylindrical mandrel, such as is described in the copending application Ser. No. 142,452. This application is a continuation-in-part and an improvement over the copending application, in that it does not require the use of a continuous cylindrical mandrel in the forming of the cylindrical plastic tube. It also provides an improved type of forming means that is simpler to construct.

BRIEF DESCRIPTION OF THE DRAWINGS

These and other objects and a better understanding of the principles and details of the invention will be evident from the following description taken in conjunction with the appended drawings, in which.

DESCRIPTION OF THE PREFERRED EMBODIMENT

Figure 1:
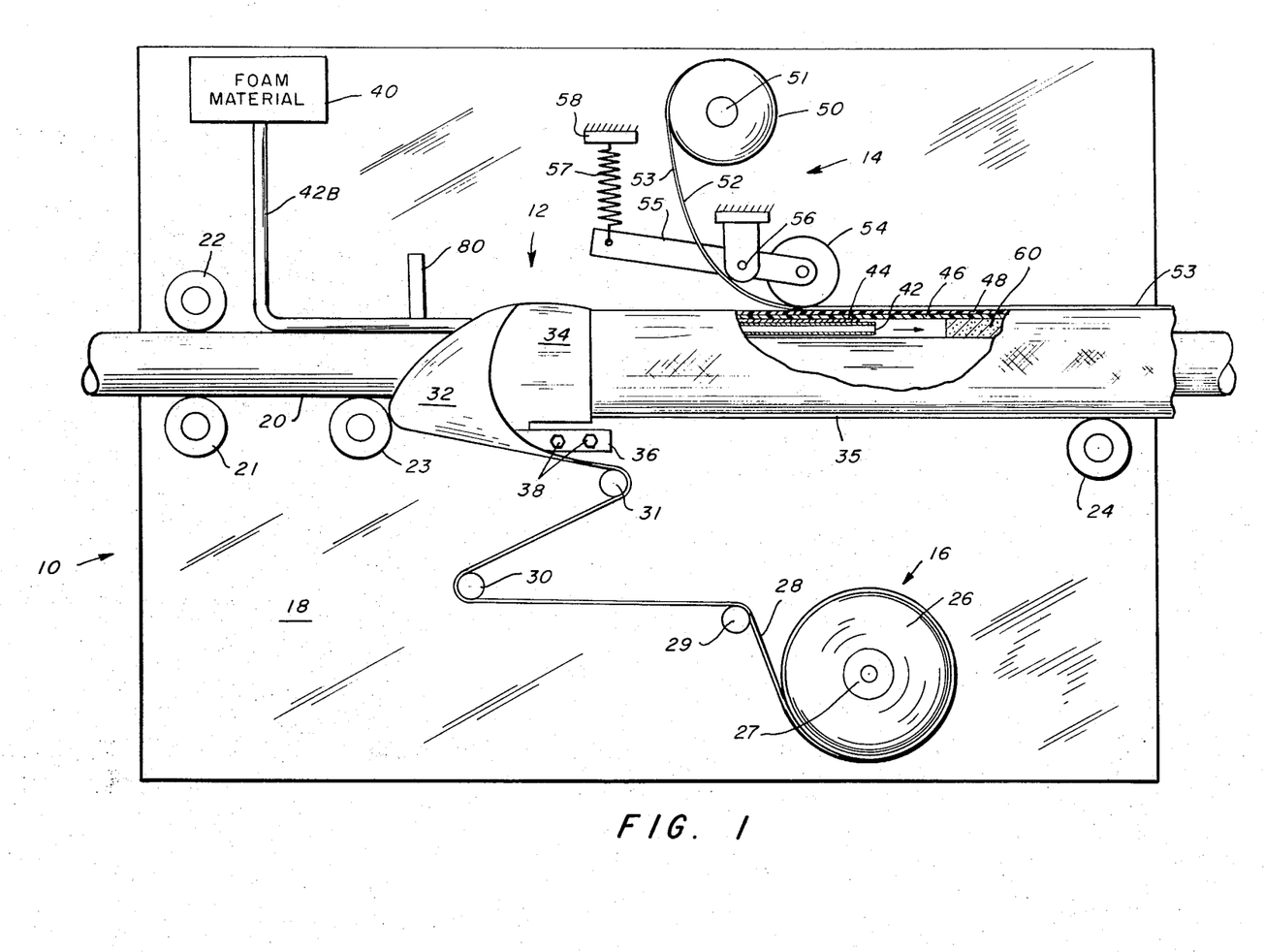
FIG. 1 is a general view of the apparatus of this invention.
Figures 2, 8:
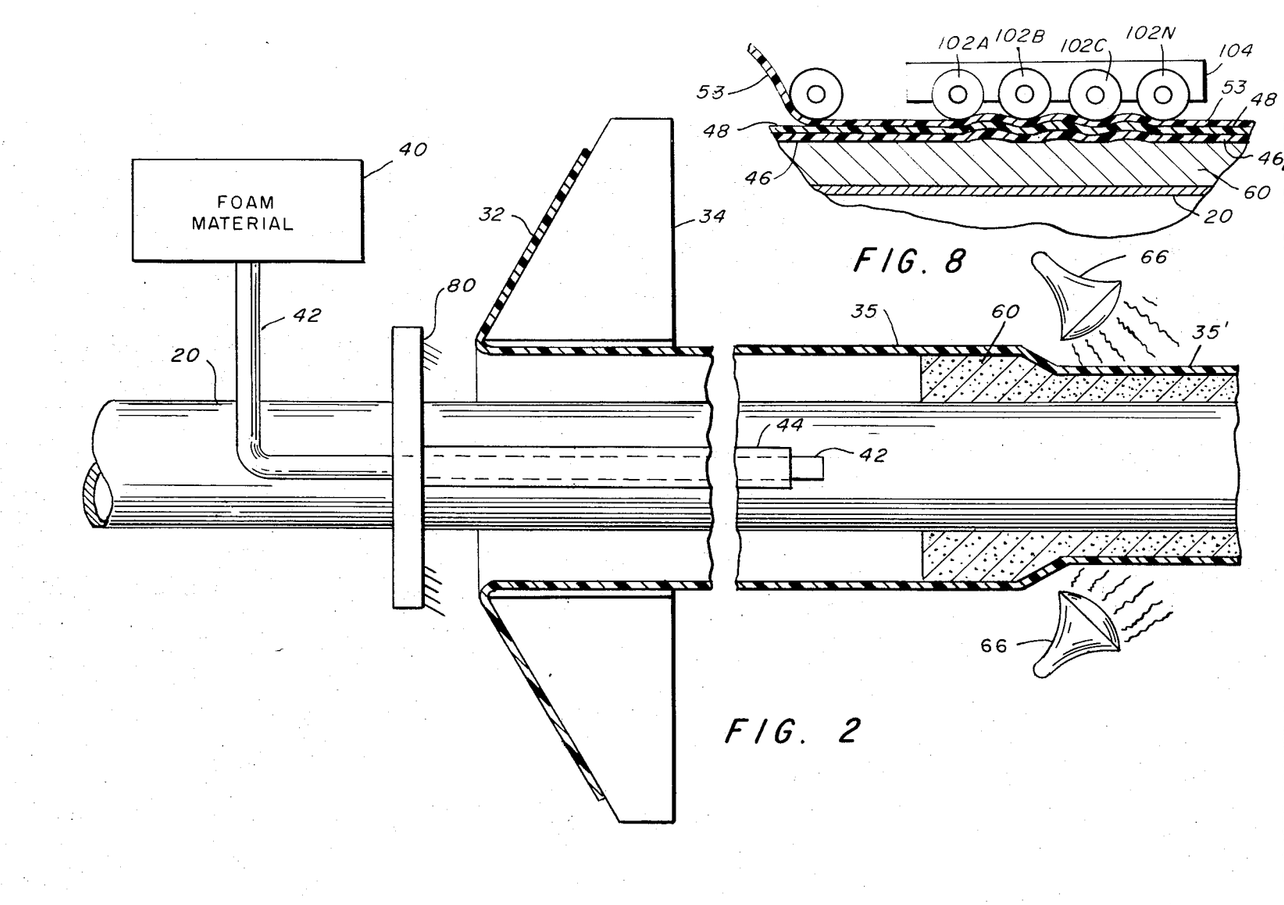
FIG. 2 is a plan view of the same apparatus taken at 90° to the direction of FIG. 1.
FIG. 8 illustrates an alternate method of applying pressure to the sealing strip.
Figures 3, 3A, 3B:
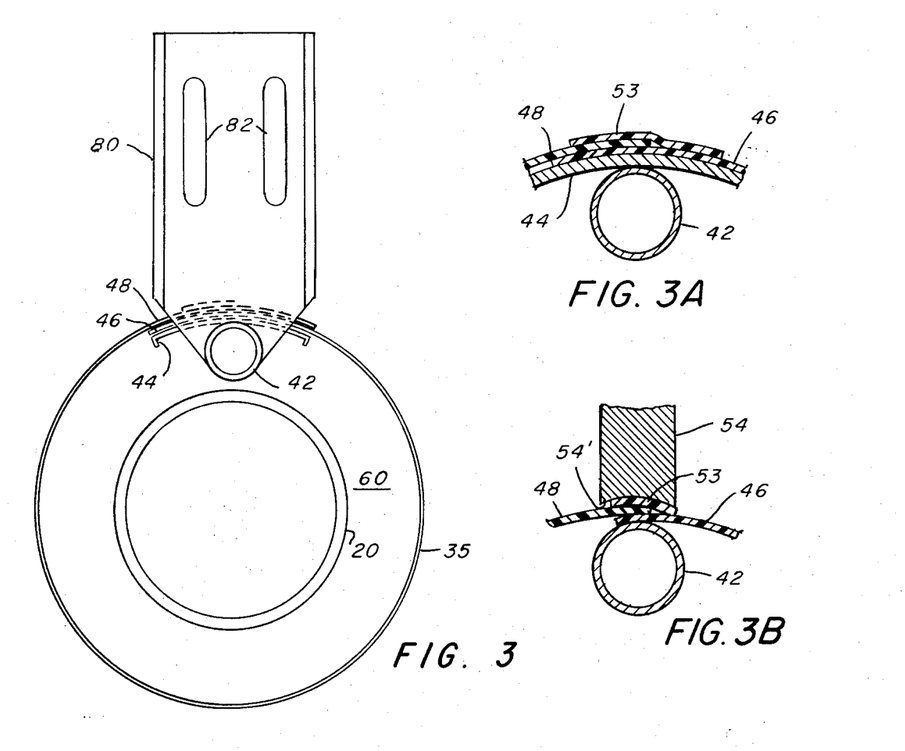
FIG. 3 is a cross section taken through FIG. 1 in the plane 3—3.
FIGS. 3A, 3B show enlarged view of part of FIG. 3.

Referring now to the drawings, and in particular to FIGS. 1, 2 and 3, which show various views of the general assembly of one embodiment of this invention. The numeral 10 indicates generally a frame which supports all of the apparatus and is adapted to be relatively longitudinally transported with respect to the long cylindrical object.

While the long cylindrical object can be a rigid or flexible cylindrical device, such as a pipe, conduit, electrical cable or similar object, for convenience it will be described in this application as a length of pipe of rigid metallic construction, such as a pipeline for transporting liquid materials, such as petroleum. In this case it is convenient to have the coating apparatus of this invention travel along the pipe so that the coating can be applied in one continuous operation, after which the pipe is dropped into its trench and covered. The frame 18 is supported by means of rollers 21, 22 and 23 so that it can be rolled along the pipe. Drive means (not shown) but well known in the art) can be used to drive the rollers 21, 22, 23, to cause the frame 18 to travel along the pipe 20, or, conversely, to cause the pipe to be traversed through the frame. In some instances, particularly for mill operations and for non-rigid objects, a roller 24 may be used to support the coated pipe. In such cases the roller 24 is supplied with soft, compressible coating so as to give firm uniform support to the coating of the pipe.

The strip film material is indicated generally by the numeral 16. The forming head which converts the strip into a cylindrical tube of film is indicated generally by the numeral 12. The sealing strip which covers and seals the overlapping edges of the film strip is indicated by the numeral 14. A roll 26 of plastic, paper or other film 28, is supported on a spindle 27 the axis of which is perpendicular to the axis of the piperline 20. This film is of sufficient width so that when it is formed into a longitudinal cylinder it will provide a cylinder of the selected diameter and, if desired, an overlapping layer of one edge on top of the other. The seam can be bonded by overlapping and cementing the two edges together. The edges can also be abutted or overlapped and a separate plastic strip with gum cement on one surface can be applied to hold the two edges of the film in proper position. The two edges of the film can be abutted with the separate sealing strip applied. Other known methods of sealing can be used. It has been found convenient to use a certain amount of overlap of the two edges with the separate gummed strip for holding the two edges in their proper position.

The strip 28 of plastic film 26 goes by way of a plurality of rollers 29, 30, 31, etc., and approaches the front end of the former 12 at an acute angle, which is normally in the range of 20°. This angle is not critical and may vary over the range of 10° to 40°, and may even increase to an angle greater than 90° with respect to the axis of the former. However, an acute angle is preferred.

The forming head 12 will be described in greater detail in connection with FIGS. 4, 5, 6, and 7. However, it is a cylindrical device 34 which is supported to the frame 18 by means of bracket 36 and bolts 38. The formed plastic strip emerges from the downstream end of the former as a cylinder 35 of plastic film, with two overlapping edges 46 and 48. This is shown more clearly in FIG. 3A which is an enlarged portion of FIG. 3, which is a cross section of the assembly of FIG. 1 of the plane 3—3.

To hold the two edges of the cylindrically formed strip in place, a roll of thin (0.001″) narrow strip of plastic material 50 is supported on a transverse bearing 51 and the strip unrolled from the reel 50 passes under a pressure roller 54 which is preferably of deformable shape so that it can deform to the contour of the outside of the edges of the plastic cylinder. It presses these edges together and against a support or pressure bar 44 which is supported by means of a bracket 80. Bracket 80 also supports the pipe or conduit 42 through which is introduced the coating material into the annulus between the pipe 20 and the plastic cylinder 35. The arcuate bar 44 and the pipe 42 are illustrated more clearly in FIGS. 3 and 3A.

In the copending application Ser. No. 142,452, the supporting device against which the pressure roller 54 acted was a complete cylindrical tubular mandrel, about which the plastic was wrapped and sealed. However, it has been determined by experiment and by operating experience that only an arcuate segment of the cylinder, or an arcuate bar is required, and consequently the complete tubular mandrel has been removed, providing a simpler assembly. The pressure roller 54 is mounted on an arm 55 which is hinged at point 56 and spring pressure 57 is utilized to apply the desired force between the sealing strip 53 and the edges of the plastic cylinder 35.

Figures 6, 7A, 7B, 7C, 7D:
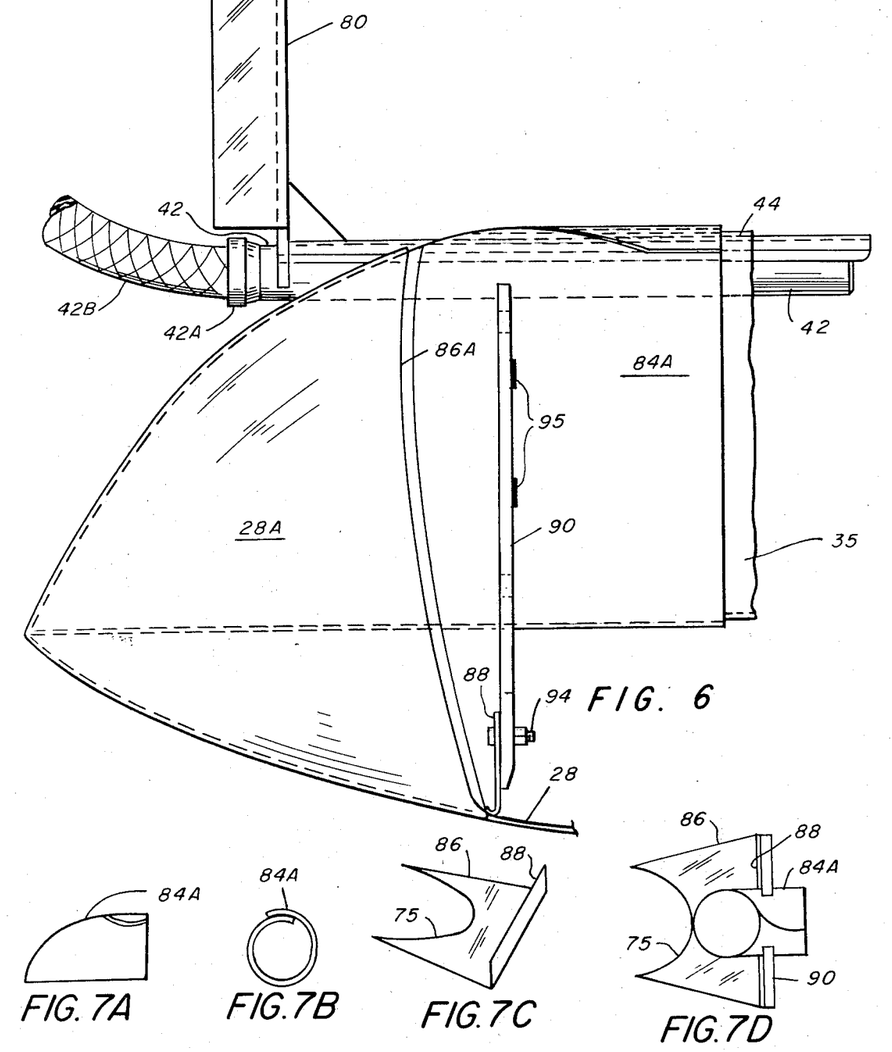
FIG. 6 represents a view of the critical portion of this apparatus, namely, the forming head, the pressure bar for supporting the sealing, roller, and the pipe for injecting the coating material.
FIGS. 7A, 7B, 7C, 7D, 7E and 7F illustrate the various steps in the construction and assembly of the forming head of this invention.

FIG. 2 is a view of the apparatus of FIG. 1 looking down on top of the pipe and shown partly in cross section. The pipe 20 is shown in outline. The arcuate support bar 44 is supported by the bracket 80 in front of the pipe 20. A supply pipe 42 is provided for the foaming material, which comes from reservoir 40 and is applied close to the top edge of the pipe 20. The forming head, of which only part is shown as 34, forms the strip 28 in a curved portion 32 and into a cylinder 35 of the plastic material. The portion including the overlapped edges is not shown in this figure since that is in front of the plane of the cross section. The coating material is introduced through pipe or conduit 41 into the annular space, where it foams to fill the annular space, and is shown as 60. While the pipe 42 is rigid inside the forming head (as shown in FIG. 6) the portion 42B that connects it with the supply tank 40 will, in general, be flexible. Heating elements 66 may be used to heat the film to cause it to shrink, if it is a heat shrinkable plastic material, so that the diameter of the cylinder 35′ downstream of the heating elements is of smaller diameter than the cylinder 35 as it is formed by the forming head 34.

FIGS. 3 and 3A illustrate more clearly the nature of the arcuate support bar 44, the coating supply pipe 42, the two overlapped edges 46 and 48 of the plastic cylinder and the sealing strip 53. In general the use of a foaming plastic coating material is very desirable. First of all, it provides good thermal insulation as well as electrical insulation. It is deformable so that it can conform to minor irregularities in the support surface of the trench into which the pipe or other project is placed. It can be designed so as to set up and harden very rapidly so that there is no serious problem in the supporting of the coated object shortly after the foam is injected into the annulus. Furthermore, the reaction of foaming is an exothermic reaction, and heat is given off, which raises the temperature of the foaming material and therefore heats the plastic film. If the film is heat shrinkable, it will thereupon be drawn more tightly around the foam plastic to provide a very tight, rigid film coating.

In FIG. 3B is shown a variation of FIG. 3A in which the arcuate bar 44 has been removed. In this case the pipe 42 through which the foam is provided also serves as the back-up member against which the roller 54 presses to seal the adhesive coated strip 53. The surface contour 54' of the roller 54 is curved to fit the contour of the pipe 42. The roller 54 can also be of deformable elastomeric material to adjust to variations in the surface 42, and thickness of material, etc.

The film as normally supplied is not weted by the plastic and after the coating has been applied it is possible to strip off the plastic film, if desired. On the other hand it is possible by means of a commercial treatment, called corona treatment, to prepare a modified surface of the film to which the foaming plastic adheres very strongly and binds the plastic and the film together to provide a stronger overall unit. This corona treatment is a commercial process which is available on the market and need not be described further. Of course, other materials than heat shrinkable plastic film can be used, such as paper or other similar sheet materials, to which the plastic can be made to adhere by various types of treatments well known in the art.

DESIGN AND CONSTRUCTION OF THE FORMING HEAD

The heart of the system of FIG. 1 is the forming head 12. This is a device which is designed so that a flat, wide strip of sheet material can be brought, at an acute angle to the axis of the former, and the material is bent over the entering edge or forming edge of the forming head so that the sheet material will be in continuous sliding contact with the surface of the former and will issue from the second end as a continuous cylinder with overlapped or abutted edges which can be sealed to form a complete continuous cylindrical tube. The contour of the entering edge is very important, because if is is not, properly designed material will not flow smoothly but will stretch at one point or bunch up at another point, with the result that the output cylinder will not be a smooth cylindrical surface. It has been found by experience that the cylindrical portions of the former can be made from a sheet which is cut along a line which represents a parabola, with its axis along the centerline of the strip. This is indicated in FIG. 4.

Figure 4:
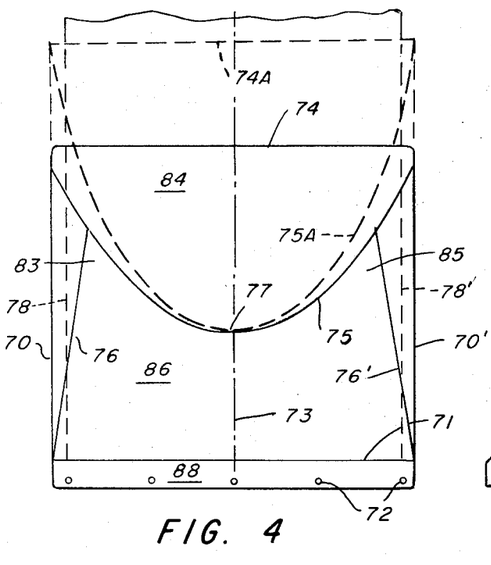
FIG. 4 represents a templet for cutting out the two matching parts of the former.

Referring to FIG. 4, the axis 73 represents the axis of the former and also the central axis of the film strip, the edges of which are represented by the dashed lines 78 and 78'. The line 71 represents a fold line and the portion 88 after being folded with respect to the remainder of the sheet becomes a means of mounting and supporting part of the former. There are two areas of the sheet, area 84 which is on the inside of a cutting line 75 which represents a convex parabola, with apex at 77. The exterior part, around the outside of the parabola is identified by numeral 86. The part 86 is called the back portion of the folder and has two wing tips 83 and 85. Once cut, the portion 84 is rolled into a cylinder with two overlapping edges and is called the neck portion of the forming head. The length of the neck portion extends from point 77 to the line 74.

A second parabola 75A is shown by dashed line which is a narrower curve and extends from the apex 77 to the line 74A. While it has not been possible, to date, to define a theoretical relationship in the form of an exact equation of the parabola in reference to the angle between the back portion and the axis of the neck portion, and the thickness of the film, it has been determined by experiments and use, that for a film of approximately 0.008'', and an angle of the order of 20° between the back portion and the axis of the neck portion that a parabola represented by the equation $y = \pm\sqrt{2Dx}$, where D is the diameter of the formed plastic cylinder, provides very satisfactory operation of the former. By changing the equation of the parabola to provide a narrower, longer neck portion, or a wider, shorter neck portion, with a different acute angle of approach of the film over the back portion, equally satisfactory operations of the folder can be obtained. The lines 76 and 76' are drawn empirically, for convenience, and the triangular portions outside of the lines 76 and 76' are cut away. This provides less interference between the folder and the film strip, and still gives sufficient support to the latter.

In constructing the former the sheet of material which, for example, might be a sheet of stainless steel of 0.010'' thickness is laid out in accordance with FIG. 4 with the proper parabola. The lines 76 and 76' are drawn and the two parts 84 and 86 are cut apart.

Figure 5:
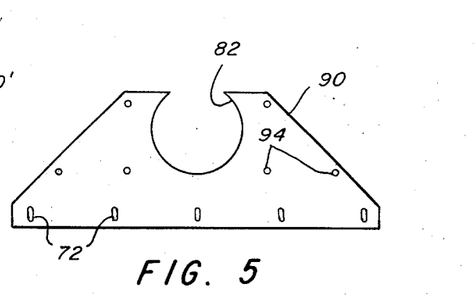
FIG. 5 represents a bracket for holding and supporting the former.

Referring now to FIGS. 5 and 7, FIG. 5 represents a support plate which will be described later. FIGS. 7A and 7B show how the inner portion of the parabola, part 84, is rolled into a circular cylindrical form with two overlapped edges 48 and 46. The designation 84A is given to the rolled portion 84, which is now the neck portion of the former. The leading edge over which the film is formed is the curve 75. The portion 86 is shown in FIG. 7C with the part 88 bent along the line 71.

Figure 7E:
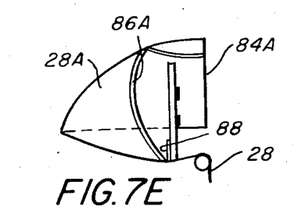
Figure 7F:
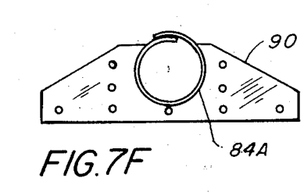

FIG. 7D shows how the rolled neck portion 84A is set on top of the back portion 86 with the corresponding points 77 placed together. The support bracket 90 (of FIG. 5) is shown in position to hold the neck portion at the proper position so that the angle α of FIG. 7E will be the correct value. An end view of FIG. 7D is shown in FIG. 7F. Following the assembly as shown by 7D the two wing portions 83 and 85 are bent around into the contour shown in 28A until the edges of the curve 75 of the back portion match along the edge 75 of the neck portion. The edges 75 of the back and neck portions are then welded together and smoothed off to provide a proper sliding surface for the film over the forming edge of the former.

A complete view of the former in its relationship to the arcuate pressure bar 44 and the pipe 42 for introducing the foaming material into the annulus, is shown in FIG. 6. The bracket 90 is shown bolted by means 94 to the part 88 of the back portion. The neck portion 84A, the back portion 86A are shown, and the film strip 28 is shown progressing up along the contour of the back portion and over the forming edge of the former and issuing as a cylindrical plastic surface 35.

It has been found that the forming operation occurs at the edge 75, and when this is properly designed, either portion alone of the forming head, that is part 84A, the neck portion, or 86A, the back portion, can be used separately to form the plastic strip into a cylinder. In other words, if the neck portion 84A is used alone the film 28 is introduced at the correct angle α, the sheet will slide over the edge 75 and the entering film will form into a surface which would be identical with that of the back portion. The film will then issue as a complete cylinder. It is not necessary to have the back portion in position under this film 28A, except that it supports it, and prevents turbulent air, etc., from disturbing the smooth flow of the film. Thus, the two portions of the forming head, that is, the neck portion 84A and the back portion 86A, need not be joined together. For example, the back can be used simply as a guide for the approaching film and the film then will be given its proper forming by the contour of the edge 75 of the neck portion 84A. The edge 75 of the back portion can be spaced apart from the edge 75 of the neck portion and the two portions can be separately supported from the frame 18. In a similar manner, it is possible to use the back portion above without the neck portion. In this case, when the back portion is properly designed and supported as a rigid unit, the edge 75 of the back portion will be the forming edge, or the edge of transition, between the approaching film and the final formed cylinder. Thus, it is possible to use (1) the neck and back portions together, integrally connected, so that there is one continuous surface between the two parts over which the film flows; or (2) the neck portion can be used alone; or (3) the back portion can be used alone; or (4) the neck portion and the back portion can be used together, but each spaced part from the other, with the back portion serving simply as a guide and the neck portion doing the forming and folding of the film.

While the material to be formed has been called a heat shrinkable film, there are many other materials that can be used. These include paper, plastics, such as vinyl plastics, including polyvinyl chloride, polyvinylidine chloride, vinyl chloride acetate, copolymers, and polyolefins such as polyethylene and many others.

These plastics while being waterproof, flexible, and easily formable also possess highly desirable dielectric properties. Accordingly, these plastic films when used in accordance with the invention, not only prevent direct contact between the pipe and/or coating and ground, or moisture, but also effectively insulate the pipe from stray electric currents.

Although these films are generally of a thickness equal to or less than about 0.010", this figure is not an absolute upper limit of the usable thickness. Generally the pipe size, coating thickness, formability of the film, and the type of film forming head will be one, all or some of the determining factors in deciding the upper limit of the usable thickness of a particular film. It is possible in some cases to increase the usable thickness of a particular film beyond this upper limit by preheating the film before forming or folding it about the pipe.

While the former can be made out of sheet material, or can be cast or otherwise fabricated it has been found experimentally that a sheet provides a very good starting point for the construction of the former as described above. Any suitable metal can be used. However, it has been found that the plastic film tends to carry an electric charge which tends to attract dust and dirt particles and grit, which as they are carried by the film over the forming surface cause it to wear and erode unless the material is of sufficient hardness to prevent this. Thus, an aluminum sheet will quickly wear, whereas a sheet of stainless steel, or hardened steel, would last a much longer time. Having fabricated the forming head out of sheet metal, it is, of course, possible also to use the finished head as a pattern and to cast a corresponding former out of hard metal such as steel.

FIGS. 2 and 3A illustrate the use of a longitudinal arcuate bar 44, which is positioned inside the formed plastic cylinder under the overlapped edges, to act as a rigid surface against which the pressure roller 54 can press to provide a good seal between the gummed strip 52 and the overlapped edges of the cylinder. FIG. 3B illustrates an embodiment in which the supply pipe 42 for the plastic material can be used as the back-up or support surface for the roller 54.

FIG. 8 illustrates an embodiment in which no pressure roller and back-up bar are used. Here a plurality of rollers 102A, 102B . . . 102N are mounted in a frame 104 supported by the frame 18. The gummed strip 53 is positioned between the rollers 102 and the overlapped seam. The pressure of the expanding foam between the central pipe 20 and rollers 102 cause the strip 53 to be tightly pressed against the plastic seam to provide the desired seal. Of course, a simple "sliding" surface can be used in place of the rollers as a back-up plate against which the foam presses.

Figure 9:
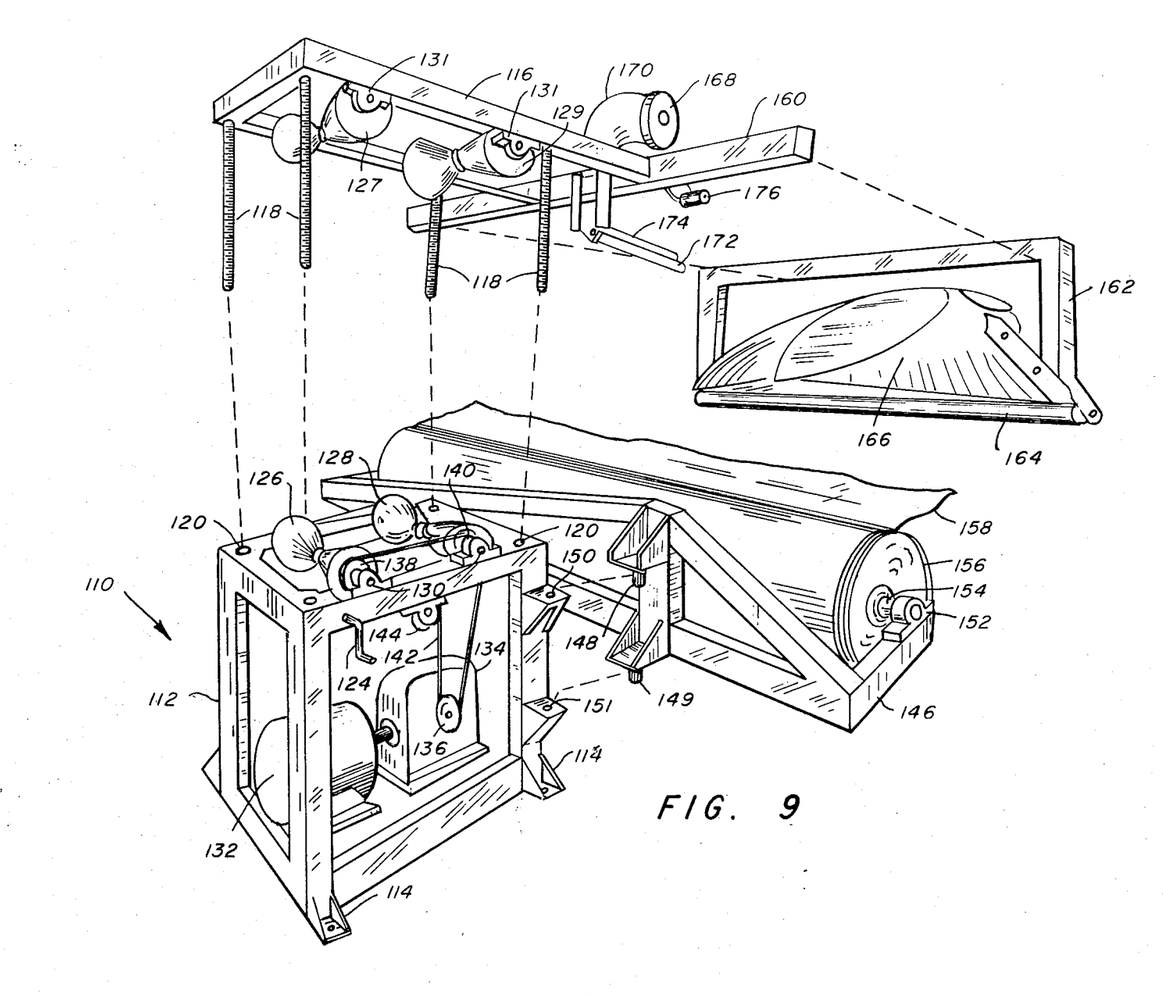
FIG. 9 illustrates an embodiment of this invention particularly adapted for shop mounting.

FIG. 9 shows a more detailed assembly of an operating embodiment of this invention. It is adapted for mill use. That is, it is adapted for stationary mounting on the floor of a shop and for the passage of separate lengths of pipe through the apparatus to be coated with foam and wrapped with film.

The apparatus is indicated generally by the numeral 110. This comprises a rectangular first frame 112 with feet 144 which can be fastened to the floor and appropriately leveled as necessary. There is a second frame 116 which is mounted above the frame 112 and is supported by a plurality of threaded rods 118 which are adapted to pass through the openings 120 in the top of first frame 112. Inside the frame 112 near the top (and hidden from view) are a plurallity of sprocket driven nuts that are adapted to screw along the rods 118. The nuts are held in fixed position so that as they are turned the rods 118 will move upward or downward depending upon the direction of rotation. The four nuts have sprockets attached to them and a chain connects all four sprockets. Means are provided including handle 124, as is well known in the art, to rotate the nuts, all of which move in synchronism, so that the frame 116 will move parallel to the frame 112 upward or downward in accordance with the direction of rotation of crank handle 124. There are two tapered rollers 126 and 128 journaled in bearings 130 in the top of the first frame 112 and there are correspondingly a pair of rollers 127 and 129 which are journaled in bearings 131 in the second frame 116. The two sets of rollers are above each other, and by their shape they are adapted to hold securely a cylindrical object such as a long pipe. By making the second frame 116 movable with respect to the first frame 112, means are provided to adapt the mechanism to handle pipes of different sizes, such as from four inches to eighteen inches in diameter, for example. There are pulleys 138 and 140 on the rollers 126 and 128. These are driven by a belt 142 from pulley 136 on the output shaft of a gear reducer 134 which is driven by motor 132. An idler 144 may be used in conjunction with the pulleys 136, 138 and 140. Thus the lower rollers are turned by the power means. Since a pipe would be grasped tightly by the two pairs of rollers, the pipe will be moved through the apparatus in accordance with the rotation of the pulley 136.

The roll of plastic film 156 is held in a third frame 146 which is supported on one corner post of the first frame 112 by means of the pins 148 and 149 which fit into sockets 150 and 151. This arrangement permits the frame to be rotated in a horizontal plane by an angle of 90° so that the frame and the roll are out in a free operating area at the side of the frame 112. By this means third frames 146 of different sizes, suitable for rolls of different width, can be interchanged. Thus, for smaller pipes, where a narrower film reel is needed, a shorter frame with a correspondingly shorter roll can be inserted. The third frame 146 has a pair of bearings 152 which support a shaft 154 which carries the roll of plastic film 156 from which is unreeled, the sheet 158.

There is a horizontal arm 160 attached to the second frame 116. This arm supports a fourth frame 162 by means not shown but well understood in the art. The frame 162 supports a horizontal idler roller 164 and the folder 166 described in connection with FIGS. 4, 5, 6 and 7. When the frame 162 is in position attached to arm 160, the film strip 158 goes around the idler roller 164 and over the folding edge and is formed into a cylinder, coming out on the right side of the apparatus.

Also attached to the second frame 116 is the tube or pipe 172 through which the plastic foam materials are injected into the annular space and a mandrel 174 comprising a strip of metal, as shown in FIGS. 1, 2 and 3, are mounted to the frame. There is also a roll 168 of adhesive coated tape, which is supported on arm 170. The strip of tape unreeling from the roll 168 is pressed against the joint in the molded strip of plastic by means of the roller 176.

While the cylindrical objects that have been described above, as suitable for coating by the method of this invention, have been circular in cross section, it will be clear that the cylindrical object can be of any desired cross section. Thus objects of square, rectangular, oval, cross section can be coated, the main difference being that the thickness of the coating will not be uniform over the entire surface. This system for applying coatings can be used with pipes, conduits, ducts, wave guides, cables and similar objects.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

For example, the folder has been described as a single, unitary cylindrical structure into which the cylindrical object to be coated is inserted. However, it is realized that in many instances, this device must be made to encircle a long continuous pipe, conduit or cable where an end is not available. In such cases we contemplate that the folder described can be constructed in two or more portions which are removably fastened together, or hinged to each other, so that the folder can be opened to encircle the pipe and then locked in its cylindrical form. Consequently when we speak of a folder, we include a single rigid assembly, or an assembly of two or more parts which can be joined into a substantially rigid assembly.

What is claimed is:

1. Apparatus for simultaneously applying to an elongated cylindrical article a circumferential layer of a selected coating material and a means for retaining said coating comprising:
   (a) a support frame;
   (b) means to axially move said article and said frame relatively to each other;
   (c) means, mounted on said frame, to supply a film strip in a direction colinear with, and in synchronism with, the movement of said conduit;
   (d) forming means supported by said frame and surrounding said article to fold and overlap said film at the top so as to create downstream about said article a substantially unsupported cylindrical tubular form of selected diameter larger than said article;
   (e) a pressure bar positioned interiorly of said overlapped film and extending downstream of said forming means;
   (f) means to position a seal strip exteriorly upon said overlapped film; and
   (g) means to inject said coating material into the annular space of said cylindrical tubular form between said conduit and said film.

2. The apparatus as in claim 1 in which said film means comprises a synthetic heat shrinkable film.

3. The apparatus as in claim 1 in which said means to seal includes means to apply pressure to said strip against said pressure bar.

4. The apparatus as in claim 3 in which said means to apply pressure comprises roller means on the strip and elongated longitudinal arcuate means inside the overlapped edges of said strip.

5. The apparatus as in claim 1 in which said pressure bar comprises a small diameter conduit, said conduit being a part of said means to inject said coating material.

6. The apparatus as in claim 1 in which said pressure bar comprises an elongated mandrel curved to the radius of the inside of said overlapped edges of said formed strip.

7. The apparatus as in claim 1 in which said folding and wrapping means comprises a reversing folding means.

8. The apparatus as in claim 1 in which said coating material comprises a foamed plastic material.

9. The apparatus of claim 8 in which said foam is chemically generated within said annular space, and including conduit means inside said annular space through which the raw materials of said foam are supplied.

10. The apparatus as in claim 1 in which said means to supply said film strip comprises a roll of said film supported by said frame and rotatable about an axis transverse to the axis of said article.

11. Apparatus of claim 1 in which said article is pipe.

12. Apparatus of claim 1 in which said article is an electrical cable.

13. Apparatus of claim 1 wherein said forming means comprises means for continuously forming a flat strip of sheet material into a cylindrical form comprising:
   (a) a cylindrical neck portion formed of a sheet of selected material cut at one end in the convex form of a parabola with its axis colinear with the axis of said sheet and of the strip to be formed, said sheet rolled into an approximate right circular cylinder with its axis parallel to the axis of said parabola, the parabolic cut end of said sheet comprising the forming edge of said former means; and
   (b) means to carry the strip to be formed at an acute angle to the axis of said neck portion toward said forming edge, the central axis of said strip aligned with the apex of said parabola, said strip passing over said forming edge and into and through said neck portion.

14. The folder means as in claim 13 including a leading supporting means, or back portion, comprising:
   (a) the portion of said sheet outside said parabola with its wing portions bent in such a manner that when the axis of said back portion is at an acute angle to said neck portion the parabolic edge of said wing portions will conform to the forming edge of said neck portion.

15. The folder means as in claim 14 in which the parabolic edges of said neck and back portions are joined, as by welding.

16. The folder means as in claim 14 in which the parabolic edges of said neck and back portions are spaced apart.

17. The former means as in claim 16 including means to vary said spacing.

18. Apparatus of claim 1 wherein said forming means comprises means for continuously forming a flat strip of sheet material into a cylindrical form, comprising:
   (a) a back portion formed of a sheet of selected material cut at one end in the form of a concave parabola with its axis colinear with the axis of the sheet and of the strip to be formed;
   (b) said sheet formed by bending the two wing portions in a continuous smooth surface until they approach each other surrounding and in contact with a cylindrical mandrel of suitable diameter, the axis of said mandrel set at a selected acute angle to the plane of the back portion;
   (c) means to permanently support said wing and back portions in this shape, the parabolic edge comprising the forming edge; and
   (d) means to carry the strip to be formed along and colinear with said back portion, over said forming edge and through said wing portions in the form of a cylinder.

19. Apparatus for simultaneously applying to an elongated cylindrical article a circumferential layer of a selected coating material and a means for retaining said coating comprising:
   (a) a first support frame and means to fasten said first frame to a horizontal surface;
   (b) at least two parallel spaced first rollers mounted in bearings on the top of said first frame; and motor means to rotate said rollers;
   (c) second frame means supported on top of said first frame by a plurality of spaced vertical screw means in operative relation to a corresponding plurality of nuts, and means to rotate said nuts in synchronism so as to raise or lower said second frame with respect to said first frame, at least two parallel spaced second rollers supported in bearings in said second frame, whereby cylindrical objects of different diameter can be held between said first and second rollers and traversed horizontally therethrough;

(d) third frame means supported from said first frame means, said third frame having bearings supporting a horizontal shaft, which carries a roll of plastic film, said shaft perpendicular to the axis of an object held in said rollers;

(e) fourth frame means supported from said second frame and carrying an idler roller parallel to the axis of said roll of film, and supporting a folder for forming said film into a cylinder surrounding an object held in said rollers and passing through said folder;

(f) means to seal said formed cylindrical film; and (g) means to inject in the annular space between said object and said formed cylindrical film the chemical materials required to form said coating.

References Cited

UNITED STATES PATENTS

| | | | |
|---|---|---|---|
| 3,434,502 | 3/1969 | Snelling | 138—133 |
| 3,432,582 | 3/1969 | Bender | 264—47 |
| 3,223,571 | 12/1965 | Straughan | 156—86 |
| 3,399,095 | 8/1968 | Hyland, Jr. | 156—195 |

FOREIGN PATENTS

| | | | |
|---|---|---|---|
| 965,185 | 7/1964 | Great Britain | 264—47 |

CHARLES E. VAN HORN, Primary Examiner

F. FRISENDA, JR., Assistant Examiner

U.S. Cl. X.R.

156—86, 391, 392, 443, 475, 494, 499, 545, 578